June 5, 1962 L. G. GOOD 3,037,384
MULTI-RANGE FLUID FLOW MEASURING APPARATUS
Filed Nov. 6, 1959 2 Sheets-Sheet 2
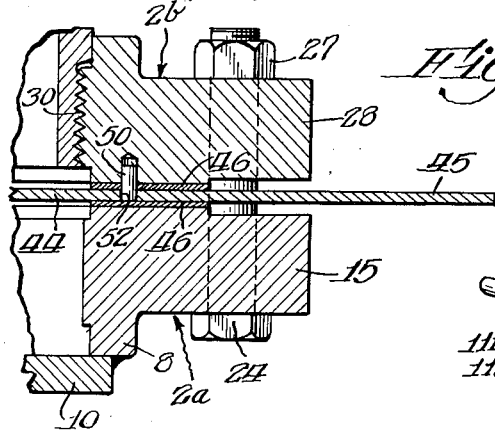
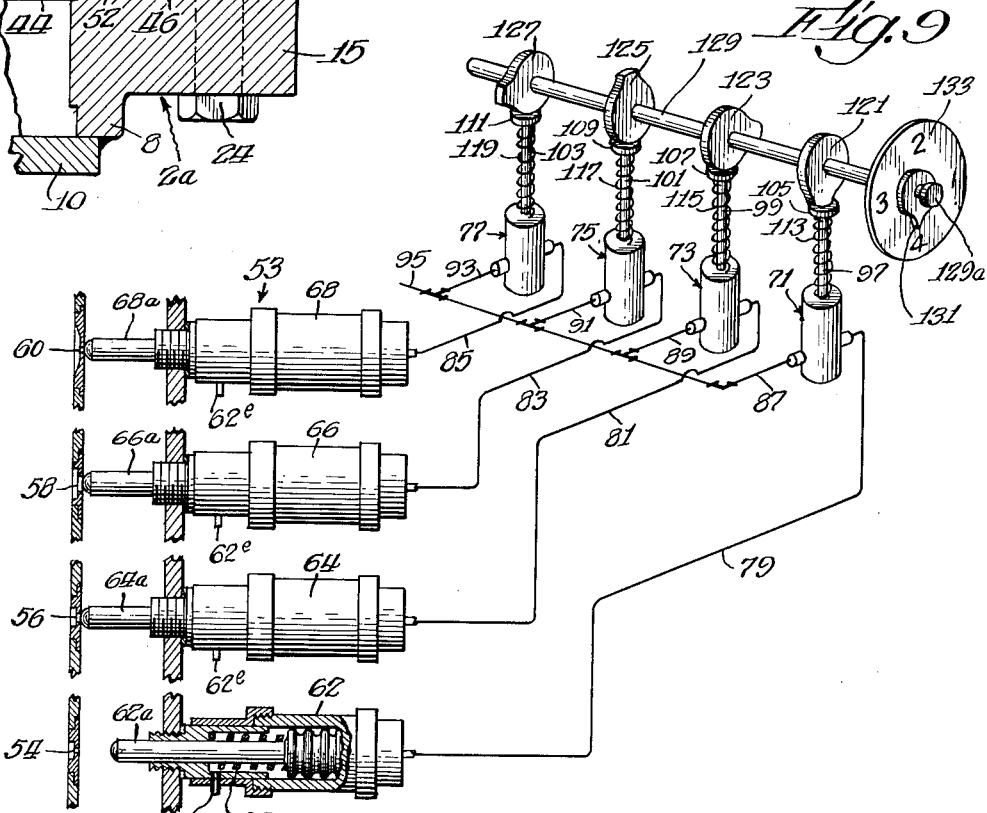
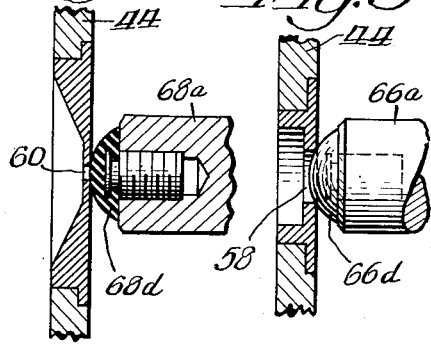
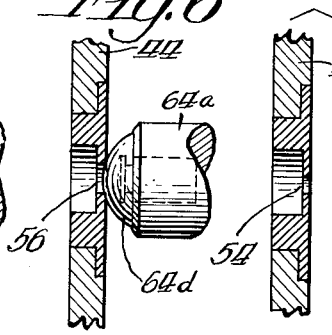
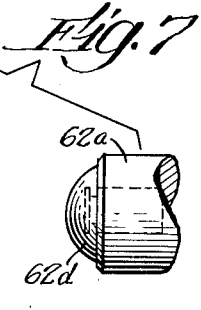
Inventor:
Louis G. Good
By Hallenstein & Spangenberg
Attys.

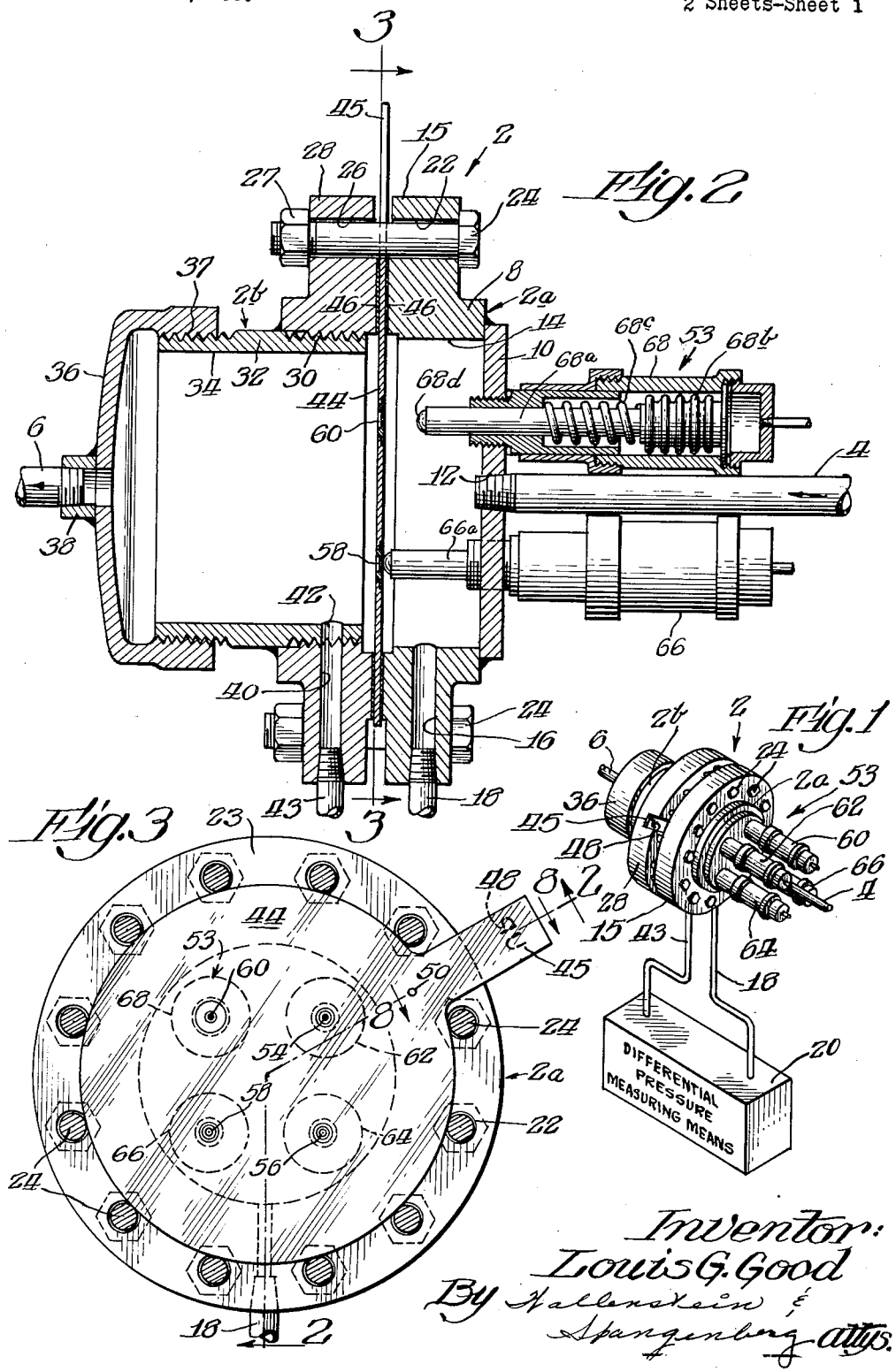

United States Patent Office 3,037,384
Patented June 5, 1962

3,037,384
MULTI-RANGE FLUID FLOW MEASURING APPARATUS
Louis G. Good, Glenview, Ill., assignor, by mesne assignments, to Information Systems, Inc., Skokie, Ill., a corporation of Illinois
Filed Nov. 6, 1959, Ser. No. 851,280
5 Claims. (Cl. 73—211)

This invention relates to a multi-range flow meter, and particularly, although not necessarily, to one which is useful for measuring very low flow rates with a relatively high degree of accuracy, as, for example, would be involved in the metering of gasoline to internal combustion engines of automobiles and the like. In many such applications the flow rates vary over wide limits, and in such case, it is desirable to have a flow meter which is useful over such a wide range of flow rates without sacrificing accuracy at the very low flow rates.

One conventional method of measuring fluid flow is by measuring the pressure drop across an orifice opening placed in the path of fluid flow. It is obvious that a single orifice is not readily adaptable to all conditions of fluid flow. An orifice small enough to produce at low flow rates a differential pressure sufficient in amount to be accurately measured will be too small to accommodate the high flow rates and, conversely, an orifice sufficiently large to accommodate a large flow rate will give almost no measurable differences in pressure at very low flow rates.

Thus, in cases where wide ranges of fluid rates must be measured, it is obviously desirable to provide a multi-range flow meter having orifices of various sizes which are quickly available. Accordingly, numerous multi-orifice flow constructions have been heretofore proposed with varying degrees of success.

It is one of the objects of the present invention to provide flow measuring apparatus including means for quickly and conveniently selecting any one of a number of different orifice sizes. A related object of the present invention is to provide fluid flow measuring apparatus wherein a desired orifice opening may be selected by the simple expedient of turning a knob. Another related object of the present invention is to provide flow measuring apparatus as above described wherein the means providing for a change in the size of the orifice opening does not unduly complicate the measuring apparatus involved or adversely affect the accuracy thereof.

These and various other objects of the present invention may become apparent upon making reference to the specification to follow, the claims and the drawings wherein:

FIG. 1 is a perspective, partially diagrammatic view showing an orifice housing assembly made in accordance with the present invention in association with the inlet and outlet pipes carrying the fluid to be measured and differential pressure measuring means for measuring the pressure drop across the selected orifice opening;

FIG. 2 is an enlarged vertical sectional view through the orifice housing assembly taken along section line 2—2 in FIG. 3 and showing the detailed features of the present invention;

FIG. 3 is a transverse sectional view through the housing assembly of FIG. 2, taken along section line 3—3 therein;

FIGS. 4 through 7 are enlarged vertical sectional views through various orifice openings usable with the present invention;

FIG. 8 is a fragmentary enlarged sectional view through a portion of the orifice housing assembly showing the manner in which an orifice plate is fixed in place therein; and FIG. 9 is a diagrammatic view illustrating the means for controlling the opening and closing of the selected orifice openings.

Referring now to the drawings, and especially to FIGS. 1 and 2, the present invention includes an orifice housing assembly generally indicated by reference numeral 2 which is inserted between an inlet pipe 4 and an outlet pipe 6 which carries the fluid to be measured. The housing assembly 2 comprises a pair of coaxially positioned housing sections 2a and 2b of circular cross section. Housing section 2a has a main cylindrical body 8 with an end plate 10 closing off the outer end of the body. The end plate 10 has a central threaded hole 12 which receives the threaded end of the inlet pipe. The housing section 2a has a cylindrical internal bore which forms a flow chamber section 14 having a diameter many times that of the inside diameter of the inlet pipe 4 as shown in FIG. 2. The housing section 2a is open at its inner end to approximately the diameter of the flow chamber 14. The inner end of the housing section 2a is enlarged to form securing flanges 15 in the bottom of which is provided a pressure tap passageway 16 which communicates with the bottom of the flow chamber section 14, the passageway 16 being threaded at its bottom end to receive the threaded upper end of a pressure tap conduit 18 leading to any suitable differential pressure measuring means generally indicated by reference numeral 20 in FIG. 1.

The flange 15 is provided with a series of circumferentially spaced holes 22 for receiving the shanks of a series of bolts 24. The bolts 24 also pass through corresponding openings 26 in a flange 28 provided on the other housing section 2b and receive nuts 27 on the ends thereof. The flange 28 as illustrated is made from an internally threaded member which threadedly receives an open-ended cylindrical member 32 having a cylindrical internal bore 34 of a similar diameter to that of the flow chamber section 14 of the housing section 2a. The members 28 and 32 are fixed in position as by welding the same together. The bore 34 forms a flow chamber section which forms a continuation of the flow chamber section in housing section 2a.

The left-hand end of the member 32 is closed off by a cup-shaped end cap member 36 which is threaded over an externally threaded portion 37 of the member 32. The end cap member 36 has a central internally threaded boss 38 which receives the threaded end of the outlet pipe 6. If desired, the housing section 2b could be made of a single casting.

The flange 28 of housing section 2b has a pressure tap passageway 40 which connects with an opening 42 formed in the member 32. The upper end of opening 42, in turn, communicates with the flow chamber section 34 within the housing section 2b. The bottom end of the passageway 40 is threaded to receive the threaded upper end of a pressure tap conduit 43 extending to the differential pressure measuring means 20. The differential pressure measuring means 20 responds to the difference in pressure at the two points within the flow chamber of the housing assembly to which the pressure tap passageways 16 and 40 extend, and may be any differential pressure measuring device well known in the art.

The confronting inner faces of the flanges 15 and 28 of the housing sections 2a and 2b have flat inner faces between which are sandwiched an assembly comprising a generally circular orifice plate 44 and a pair of sealing rings 46—46 on opposite sides of the orifice plate 44. The orifice plate 44 has a peripheral tab 45 which projects beyond the perimeter of the flanges 15 and 28 of the housing sections 2a and 2b. The tab 45 contains on one face thereof suitable indicia 48 indicating the upstream or downstream side of the orifice plate, so that the orifice plate can be properly positioned between the housing sections by unskilled personnel. To fix the angular position of the orifice plate relative to the housing sections, there is provided a dowel pin 50 (FIG. 8) extending from one of the housing sections 2b into a correspondingly sized opening 52 within the orifice plate 44. The entire housing assembly is securely clamped into a fluid sealed unit by tightening the nuts 27.

A particularly important aspect of the present invention relates to the construction and arrangement of the orifice plate 44 within the housing assembly 2 and orifice-closing means cooperating therewith generally indicated by reference numeral 53. The orifice plate 44 bridges the flow chamber formed within the housing assembly so as to interrupt the flow of fluid therethrough. The orifice plate has a series of variously sized orifices 54, 56, 58 and 60, which are preferably positioned at points spaced 90° about a circle preferably coaxial with the center of the housing assembly 2. These orifices are designed to operate over different ranges of flow rates.

The orifice-closing means may take a variety of forms, but, in the preferred form of the invention, it comprises a series of cylinders 62, 64, 66 and 68, mounted upon the outside of end wall 10 of housing assembly 2 around the inlet pipe 4 and containing flexible bellows units, such as 68b in FIG. 2. The cylinders are respectively in alignment with the orifices 54, 56, 58 and 60, and each includes a longitudinally movable valve stem 62a, 64a, 66a or 68a projecting into the housing assembly through an opening in housing end wall 10. Each valve stem is connected to the end of a flexible bellows unit which is normally urged to a right-hand position by a suitable compression spring, such as 68c. Each valve stem has a rubber-like sealing button 62d, 64d, 66d or 68d secured to the end thereof and adapted to close off the associated orifice. When the valve stem in a particular bellows unit is in its fully right-hand position, the sealing button on the end thereof is moved a substantial distance away from the associated orifice, such as a distance at least four orifice diameters, so that the sealing button does not create any turbulence in the vicinity of the associated orifice and does not otherwise impede the free flow of fluid through the orifice.

When pneumatic pressure is applied to the right-hand end of any of the bellows units, the associated valve stem is moved to the left against the opposing force of the associated spring to push the associated sealing button against the associated orifice to close the same. Vent openings, such as 62e (FIG. 9) are provided at the left hand end of each cylinder to relieve the back pressure thereat. Normally all but one of the bellows units are placed under pneumatic pressure so that only one orifice at a time may be opened. To this end, a series of pneumatic control valves 71, 73, 75 and 77 are provided remote from the housing assembly 2. The control valves have output lines 79, 81, 83 and 85 respectively leading to the right-hand ends of the bellows-containing cylinders 62, 64, 66 and 68. The pneumatic valves have inlet lines 87, 89, 91 and 93 respectively leading to a main pressure header line 95.

The pneumatic valves have upstanding valve stems 97, 99, 101 and 103 respectively terminating in cam-operated discs 105, 107, 109 and 111. The various valve stems are urged into extended positions by suitable compression springs 113, 115, 117 and 119, respectively. The extended position of any valve stem will open the associated valve which connects the pressure line 95 to the associated bellows-containing cylinder. The valve stem discs 105, 107, 109 and 111 are located opposite respective cams 121, 123, 125 and 127 having associated cam projections located at different angular positions. The cams are fixed to a shaft 129 on the end of which is secured a control knob 129a having a pointer 131 associated therewith. The pointer 131 is movable in discrete steps opposite numbered indicia on a stationary disc 133.

When the pointer 131 is positioned opposite each of the variously numbered positions on the disc 133, a different one of the cam projections of the cams 121, 123, 125 and 127 is brought against the associated valve stem disc to depress it, which shuts the associated valve. The pressure line 95 is then disconnected from the right hand end of the associated bellows unit, so that the associated valve stem 62a, 64a, 66a or 68a is urged to the right by the associated compression spring to open the associated orifice.

With the opening of a particular orifice, a pressure drop will occur in the orifice, the amount of pressure drop depending on the size orifice and flow rate involved. The pressure tap passageways 16 and 40 communicate with the flow chamber within the housing assembly at points spaced outside of the vena contacta of the flow pattern at the orifice, so that only the permanent pressure drop or loss effected by the orifice involved is measured. The enlarged flow chamber defined by the housing assembly 2 is many times larger than the size of the orifice openings to reduce the velocity of approach to a negligible amount and thus provide streamline flow ahead of the orifice openings. Also, the enlarged size of the flow chamber makes it very convenient to accommodate a large number of orifice openings and associated orifice-closing means.

It is apparent that the selection of a particular orifice is simply accomplished by turning the control knob 128 to the desired numbered angular position on the disc 133. Also, with the construction and arrangement of the various parts described, a very simple, rugged and accurate means for changing the range of operation of the flow rate measuring apparatus is provided.

It should be understood that numerous modifications may be made of a most preferred form of the invention illustrated in the drawings and just described without deviating from the broader aspects of the invention.

The term "orifice" or "orifice openings" used in the claims is intended to cover various types of pressure-dropping means such as the conventional pivot tube, venturi, nozzle and sharp and round edged orifices.

What I claim as new and desire to protect by Letters Patent of the United States is:

1. Fluid flow measuring apparatus for measuring fluid flow through a given conduit, said apparatus including an orifice housing forming a flow chamber in which the velocity of approach is negligible to provide substantially streamline flow, said housing having an inlet passageway for carrying fluid from said conduit to said flow chamber and an outlet passageway for carrying fluid out of said flow chamber, an orifice plate bridging said flow chamber in the path of flow of fluid therethrough, said orifice plate having a number of variously sized orifice openings distributed within said flow chamber for use over different flow ranges, respective orifice-covering means in said flow chamber for normally covering said orifice openings, means externally of said flow chamber for moving the orifice-covering means of a selected one of said orifice openings away therefrom a distance at least about four orifice diameters away from the associated orifice where the orifice-covering means does not interfere with the streamline flow of fluid into the associated orifice opening, and means communicating with said flow chamber upstream and downstream from said orifice plate for measuring the permanent pressure drop caused by the selected uncovered orifice opening.

2. Fluid flow measuring apparatus for measuring fluid flow through a given conduit, said apparatus including: an orifice housing forming a flow chamber in which the velocity of approach is negligible to provide substantially streamline flow, said housing having an inlet passageway for carrying fluid from said conduit to said flow chamber and an outlet passageway for carrying fluid out of said flow chamber, an orifice plate mounted in said housing and bridging said flow chamber in a plane transverse to the direction of fluid flow therethrough, said orifice plate having a number of variously sized distributed orifice openings within said flow chamber for use over different flow ranges, a longitudinally movable orifice-covering means opposite each of said orifice openings, each of said longitudinally movable orifice-covering means passing through said housing adjacent said inlet opening, individual control means mounted on the outside of the housing for separately moving each of said orifice-covering means between a position where it covers the associated orifice opening to prevent fluid flow therethrough and a position substantially removed from said orifice opening where it is at least about four orifice diameters away from the associated orifice where fluid may flow unimpeded therethrough, means for operating a selected one of said control means for opening or closing the associated orifice opening, and means communicating with said flow chamber both upstream and downstream from said orifice plate for measuring the permanent pressure drop caused by the selected uncovered orifice opening.

3. Fluid flow measuring apparatus for measuring fluid flow through a given conduit, said apparatus including an orifice housing comprising a pair of hollow housing sections having open confronting inner ends and outer ends closed by end walls, said housing sections together forming a flow chamber in which the velocity of approach is negligible to provide substantially streamline flow, the end wall of one of said housing sections having an inlet passageway in the center portion thereof for carrying fluid from said conduit to said flow chamber, the end wall of the other housing section having an outlet passageway for carrying fluid out of said chamber, an orifice plate sandwiched between said housing sections and bridging said flow chamber in the path of flow of fluid therethrough, said orifice plate having a number of variously sized orifice openings distributed within said flow chamber around the center portion thereof for use over different flow ranges, a longitudinally movable orifice-covering means opposite each of said orifice openings on the upstream side of said orifice plate, each of said longitudinally movable orifice-covering means passing through the housing end wall containing said inlet passageway, control means mounted on the outside of the latter end wall around said inlet passageway for separately moving each of said orifice-covering means between a position where it covers the associated orifice opening to prevent fluid flow therethrough and a position at least about four orifice diameters away from the associated orifice where fluid may flow unimpeded therethrough, means for operating a selected one of said control means for opening or closing the associated orifice opening, and means communicating with said flow chamber both upstream and downstream from said orifice plate for measuring the permanent pressure drop caused by the selected uncovered orifice opening.

4. Fluid flow measuring apparatus for measuring fluid flow through a given conduit, said apparatus including an orifice housing comprising a pair of hollow housing sections having open confronting inner ends and outer ends closed by end walls, said housing sections together forming a flow chamber in which the velocity of approach is negligible to provide substantially streamline flow, the end wall of one of said housing sections having an inlet passageway in the center portion thereof for carrying fluid from said conduit to said flow chamber, the end wall of the other housing section having an outlet passageway for carrying fluid out of said chamber, an orifice plate sandwiched between said housing sections and bridging said flow chamber in the path of flow of fluid therethrough, said orifice plate having a tab projecting from said housing and having means for identifying the side thereof facing the inlet side of the flow chamber, said orifice plate having a number of variously sized orifice openings distributed within said flow chamber around the center portion thereof for use over different flow ranges, a longitudinally movable orifice-covering means opposite each of said orifice openings on the upstream side of said orifice plate, each of said longitudinally movable orifice-covering means passing through the housing end wall containing said inlet passageway, control means mounted on the outside of the latter end wall around said inlet passageway for separately moving each of said orifice-covering means between a position where it covers the associated orifice opening to prevent fluid flow therethrough and a position at least about four orifice diameters away from the associated orifice where fluid may flow unimpeded therethrough, means for operating a selected one of said control means for opening or closing the associated orifice opening, and means communicating with said flow chamber both upstream and downstream from said orifice plate for measuring the permanent pressure drop caused by the selected uncovered orifice opening.

5. Fluid flow measuring apparatus for measuring fluid flow through a given conduit, said apparatus including an orifice housing forming a flow chamber in which the velocity of approach is negligible to provide substantially streamline flow, said housing having an inlet passageway for carrying fluid from said conduit to said flow chamber and an outlet passageway for carrying fluid out of said flow chamber, an orifice plate bridging said flow chamber in the path of flow of fluid therethrough, cooperating means on said orifice plate and said housing for providing a fixed predetermined angular orientation for said orifice plate, said orifice plate having a number of variously sized orifice openings distributed within said flow chamber for use over different flow ranges, respective orifice-covering means in said flow chamber for normally covering said orifice openings, means externally of said flow chamber for moving the orifice-covering means of a selected one of said orifice openings away therefrom to a point where the orifice-covering means does not interfere with the streamline flow of fluid into the associated orifice opening, said means comprising individual control means connected to said orifice-covering means and adapted when operated to move the associated orifice-covering means away from the associated orifice, a manually operable means adapted to be positioned successively to a number of different positions, means responsive to said different positions of said manually operable means for operating a different one of said control means to uncover a desired orifice opening, and means communicating with said flow chamber upstream and downstream from said orifice plate for measuring the permanent pressure drop caused by the selected uncovered orifice opening.

References Cited in the file of this patent

UNITED STATES PATENTS

| 1,273,597 | Fisher | July 23, 1918 |
| 2,150,077 | Oehler | Mar. 7, 1939 |